US011144990B1

(12) United States Patent
Santa Cruz Masoni et al.

(10) Patent No.: US 11,144,990 B1
(45) Date of Patent: Oct. 12, 2021

(54) CREDIT OFFERS BASED ON NON-TRANSACTIONAL DATA

(71) Applicant: Square, Inc., San Francisco, CA (US)

(72) Inventors: Juan Ignacio Santa Cruz Masoni, San Francisco, CA (US); Philip Spanoudes, San Francisco, CA (US); Melissa Doerken, San Francisco, CA (US); Jerome Weiss, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 16/024,167

(22) Filed: Jun. 29, 2018

(51) Int. Cl.
*G06Q 40/00* (2012.01)
*G06Q 40/02* (2012.01)

(52) U.S. Cl.
CPC .................... *G06Q 40/025* (2013.01)

(58) Field of Classification Search
CPC .................................................. G06Q 40/025
See application file for complete search history.

(56) References Cited

U.S. PATENT DOCUMENTS

| 6,941,281 | B1 | 9/2005 | Johnson |
| 7,630,932 | B2 | 12/2009 | Danaher et al. |
| 7,974,918 | B1 | 7/2011 | Kunde et al. |
| 8,150,762 | B1 | 4/2012 | Reed |
| 8,204,779 | B1 | 6/2012 | Hughes et al. |
| 8,429,067 | B1 | 4/2013 | Keller et al. |
| 9,183,480 | B1 * | 11/2015 | Quigley ........... G06K 19/06196 |
| 9,786,005 | B1 | 10/2017 | Poursartip et al. |
| 9,805,338 | B1 | 10/2017 | Ghosn et al. |
| 9,824,394 | B1 * | 11/2017 | Boates ................. G06Q 20/405 |
| 9,892,458 | B1 | 2/2018 | Shearer et al. |
| 9,984,412 | B1 | 5/2018 | Poursartip et al. |
| 10,007,953 | B1 | 6/2018 | Nathoo et al. |
| 10,019,698 | B1 | 7/2018 | Scott et al. |
| 10,373,185 | B1 | 8/2019 | Spitzer |
| 10,628,816 | B1 | 4/2020 | Scott et al. |

(Continued)

FOREIGN PATENT DOCUMENTS

WO    WO-2005119543 A1 * 12/2005 ............. G06Q 30/02

OTHER PUBLICATIONS

Waraporn et al: "Virtual Credit Cards on Mobile for M-Commerce Payment", School of Information Technology, King Mongkut's University of Technology Thonburi, Bangkok, Thailand 2009 IEEE International Conference on e-Business Engineering (Year: 2009).*

(Continued)

*Primary Examiner* — Edward J Baird
(74) *Attorney, Agent, or Firm* — Mattingly & Malur, PC

(57) ABSTRACT

In one embodiment, a method includes calculating, using a risk model for a merchant having an account with a payment service, a financing factor based on first data representing multiple transactions associated with the merchant and sending, to a computing device associated with the merchant, information associated with an offer of credit based on the financing factor for the merchant. The method also includes accessing second data stored by the payment service and containing information associated with the merchant that is not related to the transactions, where the second data provides an indication of additional future revenue for the merchant, and updating the offer of credit sent to the merchant based on the second data.

20 Claims, 14 Drawing Sheets

(56) References Cited

U.S. PATENT DOCUMENTS

| | | | |
|---|---|---|---|
| 10,832,248 B1 | 11/2020 | Kramme et al. | |
| 2001/0044756 A1 | 11/2001 | Watkins et al. | |
| 2003/0074311 A1 | 4/2003 | Saylors et al. | |
| 2004/0111361 A1 | 6/2004 | Griffiths et al. | |
| 2004/0225545 A1 | 11/2004 | Turner et al. | |
| 2004/0225594 A1 | 11/2004 | Nolan, III et al. | |
| 2005/0192862 A1 | 9/2005 | Modi | |
| 2005/0239448 A1 | 10/2005 | Bayne | |
| 2006/0242030 A1 | 10/2006 | Blanchard, Jr. et al. | |
| 2007/0067208 A1 | 3/2007 | Haggerty et al. | |
| 2007/0168277 A1* | 7/2007 | Marchesi | G06Q 40/02 705/38 |
| 2007/0271178 A1 | 11/2007 | Davis et al. | |
| 2007/0288357 A1 | 12/2007 | Holman et al. | |
| 2008/0052229 A1 | 2/2008 | Sheinker et al. | |
| 2008/0228540 A1 | 9/2008 | Megdal et al. | |
| 2008/0243569 A1 | 10/2008 | Hadden | |
| 2009/0048926 A1* | 2/2009 | Salesky | G06Q 20/10 705/14.13 |
| 2009/0222374 A1 | 9/2009 | Choudhuri et al. | |
| 2009/0222378 A1 | 9/2009 | Choudhuri et al. | |
| 2009/0313156 A1 | 12/2009 | Herr | |
| 2010/0049588 A1* | 2/2010 | Debow | G06Q 30/0217 705/38 |
| 2010/0100464 A1 | 4/2010 | Ellis et al. | |
| 2010/0114624 A1 | 5/2010 | Lakshminarayan et al. | |
| 2010/0228651 A1 | 9/2010 | Becerra et al. | |
| 2010/0262534 A1* | 10/2010 | Kaufman | G06Q 40/025 705/38 |
| 2011/0078073 A1 | 3/2011 | Annappindi | |
| 2011/0112923 A1 | 5/2011 | Chatter et al. | |
| 2011/0178902 A1 | 7/2011 | Imrey et al. | |
| 2011/0251870 A1 | 10/2011 | Tavares et al. | |
| 2011/0302018 A1 | 12/2011 | Norcross et al. | |
| 2012/0005036 A1 | 1/2012 | Erickson | |
| 2012/0054097 A1 | 3/2012 | Frohwein et al. | |
| 2012/0089436 A1 | 4/2012 | Tavares et al. | |
| 2012/0109820 A1 | 5/2012 | Galit et al. | |
| 2012/0185311 A1 | 7/2012 | Tavares et al. | |
| 2012/0232974 A1 | 9/2012 | Castiglione | |
| 2012/0233090 A1 | 9/2012 | Tavares et al. | |
| 2012/0239552 A1 | 9/2012 | Harychi | |
| 2012/0310686 A1 | 12/2012 | Carter | |
| 2012/0330741 A1 | 12/2012 | Cruz | |
| 2012/0330769 A1 | 12/2012 | Arceo | |
| 2013/0013477 A1 | 1/2013 | Ortega | |
| 2013/0110607 A1 | 5/2013 | Basmajian et al. | |
| 2013/0231974 A1 | 9/2013 | Harris et al. | |
| 2013/0268342 A1 | 10/2013 | Tune et al. | |
| 2013/0305356 A1 | 11/2013 | Cohen-Ganor et al. | |
| 2013/0339219 A1 | 12/2013 | Bernheimer et al. | |
| 2014/0006202 A1 | 1/2014 | Frohwein et al. | |
| 2014/0012780 A1 | 1/2014 | Sanders | |
| 2014/0025446 A1* | 1/2014 | Nagarajan | G06Q 30/0207 705/14.1 |
| 2014/0025542 A1* | 1/2014 | Sharma | G06Q 10/08 705/28 |
| 2014/0122195 A1 | 5/2014 | Tabor et al. | |
| 2014/0172560 A1 | 6/2014 | Satyavolu et al. | |
| 2014/0180826 A1 | 6/2014 | Boal | |
| 2014/0229397 A1 | 8/2014 | Fink | |
| 2014/0258088 A1 | 9/2014 | Belarj | |
| 2014/0351116 A1 | 11/2014 | Hoff | |
| 2014/0358766 A1 | 12/2014 | Nayyar et al. | |
| 2015/0019404 A1* | 1/2015 | Karamchedu | G06Q 50/01 705/38 |
| 2015/0026035 A1 | 1/2015 | Showalter | |
| 2015/0066635 A1 | 3/2015 | Valin et al. | |
| 2015/0100475 A1 | 4/2015 | Cummings et al. | |
| 2015/0106260 A1 | 4/2015 | Andrews et al. | |
| 2015/0149333 A1 | 5/2015 | Yaplee et al. | |
| 2015/0180833 A1 | 6/2015 | Snow et al. | |
| 2015/0348083 A1 | 12/2015 | Brill et al. | |
| 2015/0371335 A1 | 12/2015 | Liptak et al. | |
| 2016/0012465 A1 | 1/2016 | Sharp | |
| 2016/0086222 A1 | 3/2016 | Kurapati | |
| 2016/0189292 A1 | 6/2016 | Deshpande et al. | |
| 2017/0193596 A1* | 7/2017 | Bol | G06Q 40/025 |
| 2017/0255793 A1 | 9/2017 | Caldwell | |
| 2018/0040064 A1* | 2/2018 | Grigg | G06N 5/04 |
| 2018/0053253 A1 | 2/2018 | Gokhale et al. | |
| 2018/0150910 A1 | 5/2018 | Grech et al. | |
| 2018/0158091 A1 | 6/2018 | Ovick et al. | |
| 2018/0204280 A1 | 7/2018 | Painter et al. | |
| 2018/0225648 A1 | 8/2018 | Robinson et al. | |
| 2018/0349990 A1 | 12/2018 | Diriye et al. | |
| 2019/0172155 A1 | 6/2019 | Byron et al. | |

OTHER PUBLICATIONS

Non-Final Office Action dated Apr. 4, 2018, for U.S. Appl. No. 15/855,802, of Jew, W., et al., filed Dec. 27, 2017.

Final Office Action dated Jan. 11, 2019, for U.S. Appl. No. 16/024,140, of Masoni, J.I.S.C., et al., filed Jun. 29, 2018.

Advisory Action dated Feb. 8, 2019, for U.S. Appl. No. 15/855,802, of Jew, W., et al., filed Dec. 27, 2017.

Notice of Allowance dated Mar. 22, 2019, for U.S. Appl. No. 14/985,191, of Spitzer, G., filed Dec. 30, 2015.

Non-Final Office Action dated Aug. 7, 2019, for U.S. Appl. No. 16/024,140, of Masoni, J.I.S.C., et al., filed Jun. 29, 2018.

Non-Final Office Action dated Aug. 22, 2019, for U.S. Appl. No. 15/911,221, of Scott, J.B., et al., filed Mar. 5, 2018.

Non-Final Office Action dated Oct. 2, 2019, for U.S. Appl. No. 15/855,802, of Jew, W., et al., filed Dec. 27, 2017.

Non-Final Office Action dated Dec. 13, 2019, for U.S. Appl. No. 16/517,374, of Daya, R., et al., filed Jul. 19, 2019.

Notice of Allowance dated Dec. 23, 2019, for U.S. Appl. No. 15/911,221, of Scott, J.B., et al., filed Mar. 5, 2018.

Final Office Action dated Jan. 17, 2020, for U.S. Appl. No. 16/024,140, of Masoni, J.I.S.C., et al., filed Jun. 29, 2018.

Final Office Action dated Mar. 6, 2020, for U.S. Appl. No. 15/855,802, of Jew, W., et al., filed Dec. 27, 2017.

Final Office Action dated Mar. 6, 2020, for U.S. Appl. No. 16/517,374, of Daya, R., et al., filed Jul. 19, 2019.

Advisory Action dated Apr. 3, 2020, for U.S. Appl. No. 16/024,140, of Masoni, J.I.S.C., et al., filed Jun. 29, 2018.

Non-Final Office Action dated on May 15, 2020, U.S. Appl. No. 15/995,039, of Perelli-Minetti, L., et al., filed May 31, 2018.

Advisory Action dated May 21, 2020, for U.S. Appl. No. 15/855,802, of Jew, W., et al., filed Dec. 27, 2017.

Non-Final Office Action dated Jun. 25, 2020, U.S. Appl. No. 15/994,882, of Kerof, V., et al., filed May 31, 2018.

Non-Final Office Action dated Jul. 23, 2020, for U.S. Appl. No. 16/024,140, of Masoni, J.I.S.C., et al., filed Jun. 29, 2018.

Non-Final Office Action dated Oct. 30, 2020, for U.S. Appl. No. 16/517,374, of Daya, R., et al., filed Jul. 19, 2019.

Final Office Action dated Feb. 16, 2021, for U.S. Appl. No. 16/024,140, of Masoni, J.I.S.C., et al., filed Jun. 29, 2018.

"MCM Poll Results: 72 percent of Mobile Food Vendor only accept cash," Mobile Cuisine Magazine, accessed at http://web.archive.org/web/201104 23204019/mobile-cuisine.com/features/mcm-poll-results-72-percent -of-mobile-food-vendors-onty-accept -cash/, pp. 2 (Jan. 25, 2011).

Non-Final Office Action dated Sep. 4, 2018, for U.S. Appl. No. 16/024,140, of Masoni, J.I.S.C, et al., filed Jun. 29, 2018.

Non-Final Office Action dated Sep. 27, 2018, for U.S. Appl. No. 14/985,191, of Spitzer et al., filed Dec. 30, 2015.

Final Office Action dated Nov. 19, 2018, for U.S. Appl. No. 15/855,802, of Jew et al., filed Dec. 27, 2017.

* cited by examiner

Capital

Q Search Dashboard & Support

Interested in more than $12,000?
Your business may be eligible for more funds than your current $12,000 offer.
Just link your bank account to find out if you qualify.

[Get Started] — 422

400b — 420

Select a loan offer

$12,000 — 424a $1,680 total borrowing cost
$13,680 total owed
Pay back with 13% of daily card sales $2,355.45 of new loan will be used to pay off your current plan.

[Request $12,000] — 426a

$10,000 — 424b $1,140 total borrowing cost
$11,400 total owed
Pay back with 11% of daily card sales $2,355.45 of new loan will be used to pay off your current plan.

[Request $10,000] — 426b

$8,000 — 424c $1,120 total borrowing cost
$13,680 total owed
Pay back with 9% of daily card sales $2,355.45 of new loan will be used to pay off your current plan.

[Request $8,000] — 426c

Looking for a different loan amount? Click here>

*FIG. 4B*

Capital

400d

Q Search Dashboard & Support

440

We'll be in touch soon!

You've successfully linked your bank account! Your business revenue will be reviewed to see if you qualify for a larger loan offer, which can take 1-3 days. Be on the lookout for an email regarding your request.

If you'd like to view your existing offer, Click here>

① Link Your Bank Account
Connect the bank account that process the most business revenue so we can evaluate your business for larger loan offers now and in the future.

② Wait 1-3 Business Days
After your account is linked, your business revenue will be reviewed within one to three business days to determine if you qualify.

③ Select a Loan Offer
Once your account has been reviewed, we'll notify you by email. Your current offer will still be available if you don't qualify for a larger loan offer.

*FIG. 4D*

Capital

🔍 Search Dashboard & Support — 450

ⓘ Hold tight! Your business revenue is being reviewed.
You've successfully linked your bank account! Your business revenue is being reviewed to see if you qualify for a larger loan offer, which can take one to three business days. In the meantime, you can review your current offers below.

Select a loan offer

424a

$12,000

$1,680 total borrowing cost
$13,680 total owed
Pay back with 13% of daily card sales $2,355.45 of new loan will be used to pay off your current plan.

[ Request $12,000 ] — 426a

424b

ⓘ

$10,000

$1,140 total borrowing cost
$11,400 total owed
Pay back with 11% of daily card sales $2,355.45 of new loan will be used to pay off your current plan.

[ Request $10,000 ] — 426b

424c

ⓘ

$8,000

$1,120 total borrowing cost
$13,680 total owed
Pay back with 9% of daily card sales $2,355.45 of new loan will be used to pay off your current plan.

[ Request $8,000 ] — 426c

Looking for a different loan amount? Click here>

Capital

Q Search Dashboard & Support — 470

(S) Congratulations, your maximum loan offer has increased from $12,000 to $20,000.
Your additional business revenue have been reviewed. Your updated offers are below.

Select a loan offer below — 474a

$20,000
(previously $12,000)

$1,140 total borrowing cost
$11,400 total owed
Pay back with 11% of daily card sales $2,355.45 of new loan will be used to pay off your current plan.

[ Request $20,000 ] — 476a

474b

$16,000
(previously $10,000)

$1,140 total borrowing cost
$11,400 total owed
Pay back with 11% of daily card sales $2,355.45 of new loan will be used to pay off your current plan.

[ Request $16,000 ] — 476b

474c

$10,000
(previously $8,000)

$1,140 total borrowing cost
$11,400 total owed
Pay back with 11% of daily card sales $2,355.45 of new loan will be used to pay off your current plan.

[ Request $10,000 ] — 476c

Looking for a different loan amount? Click here>>

Capital

Q Search Dashboard & Support — 480

$ Thank you for connecting your bank account!
Your additional business revenue has been reviewed and you do not qualify for an increase loan at this time. However, you are still eligible to apply for your current offers below. Learn More>

Select a loan offer

$12,000 — 424a $1,680 total borrowing cost
$13,680 total owed
Pay back with 13% of daily card sales $2,355.45 of new loan will be used to pay off your current plan. — 426a

[ Request $12,000 ]

$10,000 — 424b $1,140 total borrowing cost
$11,400 total owed
Pay back with 11% of daily card sales $2,355.45 of new loan will be used to pay off your current plan. — 426b

[ Request $10,000 ]

$8,000 — 424c $1,120 total borrowing cost
$13,680 total owed
Pay back with 9% of daily card sales $2,355.45 of new loan will be used to pay off your current plan. — 426c

[ Request $8,000 ]

Looking for a different loan amount? Click here>

CREDIT OFFERS BASED ON NON-TRANSACTIONAL DATA

BACKGROUND

A financial-service provider may offer capital loans to businesses. The sizes of the capital loans offered may be determined based on an assessment of each business's capability to repay using information associated with the business that is available to the financial-service provider. One useful source of information for a particular business may be records of the business's transactions with its customers, which may provide evidence as to the income or revenue of the business. However, such information may not be fully available to the financial-service provider because the business may conduct transactions using methods not recorded by the financial-service provider. In particular, the business may use one or more platforms other than the financial-service provider to conduct transactions. Furthermore, activities other than transactions with customers may provide useful information as to the creditworthiness of a business. Credit offers made without considering particular information that is unavailable to the financial-service provider may be based on an inaccurate assessment of target businesses and may harm the profitability of such loan services. Also, only a portion of the information about a business may be related to the business' capability to repay a loan. Considering all information about a business may lead to calculation of an inaccurate credit offer based on false assessment of the business' capability to repay. Furthermore, accessing various business data from different platforms and calculating capital loans often cause a delay in providing capital loan offers to the business.

BRIEF DESCRIPTION OF THE DRAWINGS

FIGS. 4A-4H illustrate example user interfaces for obtaining data associated with a merchant stored by third-party systems and updating offers of credit based on the data.

DESCRIPTION OF EXAMPLE EMBODIMENTS

Figure 1:
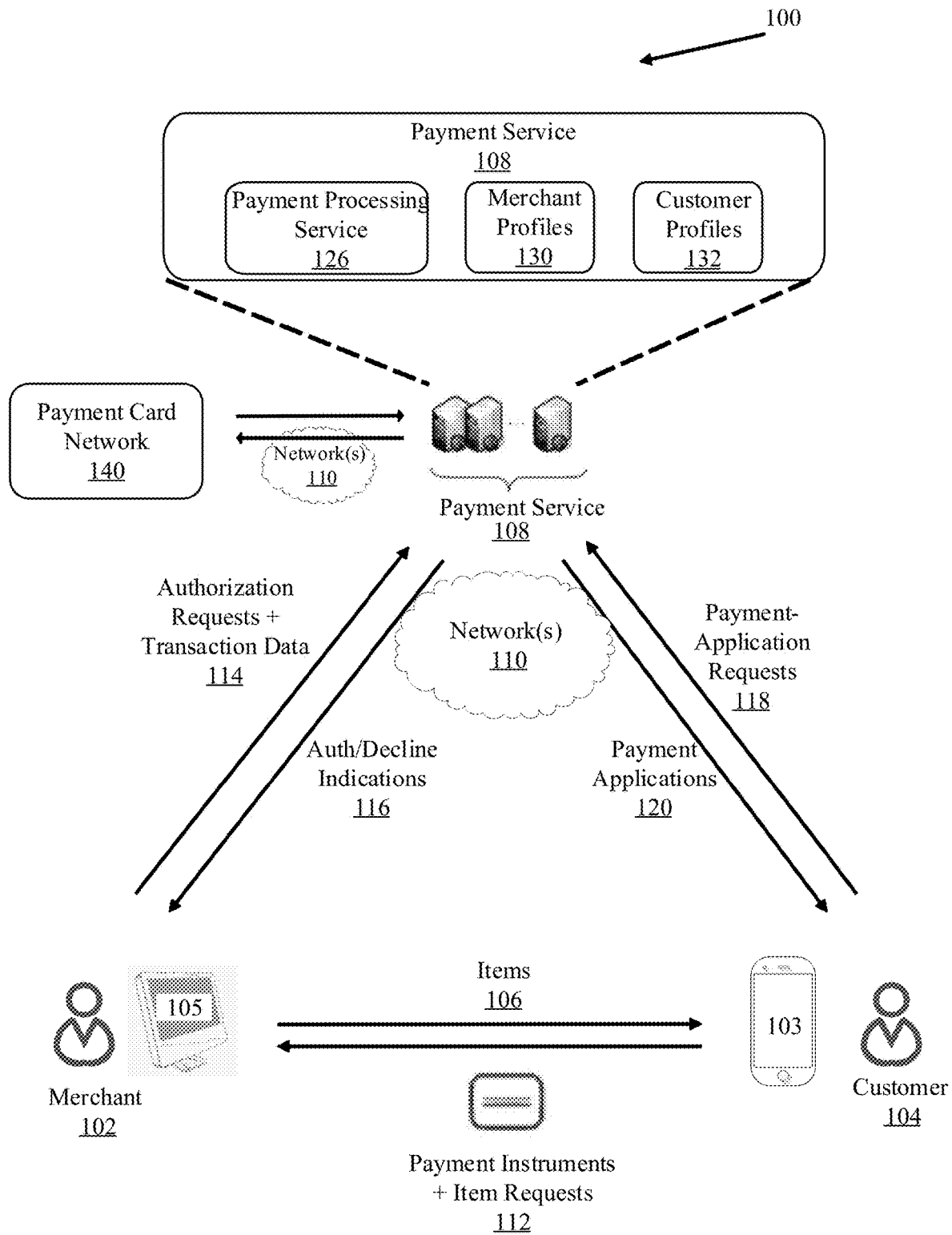
FIG. 1 illustrates an example system for processing payments.

In particular embodiments, a payment service system may make decisions related to extending credit offers to merchants having accounts with the payment service based on data associated with transactions processed by the payment service, data obtained from third-party systems, and non-transaction data collected by the payment service. In particular embodiments, a payment service provider may offer loans to merchants. The payment service system may use a risk model to analyze data associated with a merchant to determine the merchant's eligibility for a credit offer as well as a proper credit limit for the merchant. The risk model may comprise one or more component models based on machine-learning or artificial intelligence techniques. The component models may each be dedicated to a particular functionality. For example, the risk model may comprise a machine-learning model for calculating a probability of default for each of a plurality of merchants, a machine-learning model for calculating a financing factor based on transactions processed by the payment service system, a machine-learning model for calculating a financing factor based on transactions recorded by one or more third-party systems, or a machine-learning model for calculating a financing factor based on data not related to transactions. The payment service system may process transactions for a plurality of merchants. The transactions may include, for example, payments by customers to the merchants in exchange for goods or services. The payment service system may obtain insights into a merchant (e.g., monthly revenue of the merchant) based on such transactions. Based on such insights, the payment service may make one or more credit offers to the merchant or decide to not extend credit to the merchant. However, the merchant may have additional revenue from transactions other than those processed by the payment service. The payment service may obtain authorization from the merchant to access data associated with one or more third-party systems and update its decisions related to credit offers for the merchant based on the data. Furthermore, the payment service provider may offer one or more additional services to a merchant (e.g., appointment management, payroll, inventory management, marketing, customer information management). The payment service system may further derive knowledge as to the merchant's eligibility for a loan and ability to repay based on the merchant's use of these additional services and, accordingly, update its decisions related to credit offers for the merchant.

In particular embodiments, the payment service system may calculate, using a risk model, a probability of default for each of a plurality of merchants based on a plurality of transactions associated with the merchant that are processed by the payment service. For each of those merchants having a probability of default the satisfies a threshold, the payment service system may calculate, using the risk model, a first financing factor based on the transactions, generate an offer of credit based on the first financing factor, and send the offer of credit to the merchant. The payment service system may intelligently determine whether the merchant has income other that from the transactions processed by the payment service. If the merchant is determined to be likely to have additional income, the payment service system may also provide, via a user interface associated with the merchant, an option to authorize access to third-party financial data. The payment service system may confirm whether authorization has been obtained to access data stored by one or more third-party systems associated with the merchant. If so, the payment service system may access the data stored by the third-party systems and identify a plurality of transactions there. The payment service system may calculate, using the risk model, a second financing factor based on these transactions, generate a new offer of credit or modify the existing offer of credit based on the first financing factor and the second financing factor, and send the new or modified offer of credit to the merchant.

In particular embodiments, the payment service system may calculate, using a risk model, a probability of default for each of a plurality of merchants based on a plurality of transactions associated with the merchant that are processed by the payment service. For each of those merchants having a probability of default the satisfies a threshold, the payment service system may calculate, using the risk model, a first financing factor based on the transactions, generate an offer of credit based on the first financing factor, and send the offer of credit to the merchant. The payment service may also access data containing information associated with the merchant that is not related to the transactions processed by the payment service. The payment service system may calculate, using the risk model, a second financing factor based on such data, generate a new offer of credit or modify the existing offer for credit based on the first financing factor and the second financing factor, and send the new or modified offer of credit to the merchant.

In particular embodiments, the payment service system may access transaction data processed by the payment service, third-party transaction data, and non-transaction data and calculate credit offers for a merchant in a proactive manner and on a regular basis (e.g., once a day). This may eliminate any delay in provisioning credit offers based on newest data to the merchant. It may also conserve the processing resources of the payment service system as the schedule of proactive calculation of credit offers can be optimized to minimize fluctuation in the amount of computation required or to concentrate computation to times when processing resources is abundant (e.g., when other functionalities of the payment service system are barely used). In particular embodiments, the payment service system may use one or more models based on machine learning, artificial intelligence, or other suitable techniques to intelligently discern information indicative of the repayment capacity of a merchant from disparate sources and various types of financial information. This may ensure calculation of accurate and appropriate credit offers for the merchant and thereby improve the accuracy and effect of prior credit systems.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1 illustrates an example environment 100 that includes merchant 102 that conducts transactions with customer 104 (or "user 104") for items 106 offered by the merchant 102. FIG. 1 also illustrates a payment service system 108 (also referred to as "payment service"), coupled to merchant point of sale (POS) device 105 and customer device 103 via a network 110, to authorize payment instruments of customer 104.

Customer 104 may engage in transactions with merchant 102 to obtain items 106. Customer 104 may provide, as shown at 112, cash or any other kind of payment instruments to merchant 102 along with requests for items offered by merchant 102.

Merchant 102 may utilize POS device 105 for accepting payment from customers 104. POS device 105 may comprise any sort of mobile or non-mobile devices that include instances of a merchant application that executes on the devices. The merchant application may provide POS functionality to POS device 105 to enable merchant 102 (e.g., owners, employees, etc.) to accept payments from customers 104. In some types of businesses, POS device 105 may correspond to a store or other place of business of the merchant, and thus, may be a fixed location that typically does not change on a day-to-day basis. In other types of businesses, however, the location of POS device 105 may change from time to time, such as in the case that a merchant operates a food truck, is a street vendor, is a cab driver, etc., or has an otherwise mobile business, e.g., in the case of a merchant who sells items at buyer's homes, places of business, and so forth.

As used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items, e.g. item 106. Thus, a merchant and a customer may interact with each other to conduct a transaction in which the customer acquires item 106 from merchant 102, and in return, customer 104 provides payment 112 to merchant 102.

As used herein, a transaction may include a financial transaction for the acquisition of item(s) that is conducted between customer 104 and merchant 102. For example, when paying for a transaction, customer 104 may provide the amount that is due to the merchant using cash or other payment instrument 112 (e.g., a debit card, a credit card, a stored-value or gift card, a check, through an electronic payment application on device 103 carried by the customer, or the like). The merchant may interact with POS device 105 to process the transactions, such as by inputting (e.g., manually, via a magnetic card reader, NFC reader, or an RFID reader, etc.) identifiers associated with payment instrument 112. For example, a payment instrument of the customer may include a card having one or more magnetic strips for providing card and customer information when swiped in a card reader. In other examples, other types of payment instruments may be used, such as smart cards having a built-in memory chip that is read by the device when the card is "dipped" into the reader, such as chips that comply with the Europay, MasterCard, Visa (EMV) standard, i.e. EMV cards. In other examples, other types of payment instruments include cards or computing devices that communicate via radiofrequencies such as a radiofrequency identification tags, and near field communication devices, etc.

During the transaction, POS device 105 may determine transaction information describing the transaction, such as the identifier of the payment instrument, an amount of payment received from the customer, the item(s) acquired by the customer, a time, place and date of the transaction, a payment network 140 associated with the payment instrument, an issuing bank of the payment instrument, a name or user account of the customer, contact information of the customer, type of the currency, and so forth. POS device 105 may send the transaction information to payment service 108 over network 110, either substantially contemporaneously with the conducting of the transaction (in the case of online transactions) or later when POS device 105 is in the online mode (in the case offline transactions).

In an offline transaction, POS device 105 may store one or more characteristics associated with the transaction (i.e., the transaction information), such as a cost of the transaction, a time of day at which the transaction occurred, a day of the week at which the transaction occurred, a location at which the transaction took place, an item that the customer obtained, an identity and/or contact information of the customer, and a payment instrument used in the transaction. After conducting an offline transaction with customer 104, POS device 105 may provide the stored information (or some subset of it) to the payment service 108 over the network 110. The network 110 may represent any one or more wired or wireless networks, such as a Wi-Fi network, a cellular network, or the like. In an online transaction, POS device 105 may send this information to payment service 108 over network 110 substantially contemporaneously with the transaction with the customer.

After merchant 102 receives the payment information from customer 104, merchant 102 may send respective authorization requests, along with information regarding the respective transactions, to payment service 108, as illustrated at 114. Payment service 108 may include payment processing service 126, merchant profiles 130, and customer profiles 132.

The payment processing service 126 may function to receive the information regarding a transaction from POS device 105 of merchant 102 and attempt to authorize the payment instrument used to conduct the transaction. Payment processing service 126 may then send an indication of whether the payment instrument has been approved or declined back to POS device 105, as illustrated at 116.

Generally, when a customer and a merchant enter into an electronic payment transaction, the transaction is processed by electronically transferring funds from a financial account associated with the customer to a financial account associated with the merchant. As such, the payment processing service 126 may communicate with one or more computing devices of a payment card network 140 (or "card payment network"), e.g., MasterCard®, VISA®, over network(s) 110 to conduct financial transactions electronically. Payment processing service 126 may also communicate with one or more computing devices of one or more banks, processing/acquiring services, or the like over the network 110. For example, payment processing service 126 may communicate with an acquiring bank, and/or an issuing bank, and/or a bank maintaining customer accounts for electronic payments. Payment processing service 126 may also communicate with, or access customer and merchant accounts maintained by payment service 108.

An acquiring bank may be a registered member of a card association (e.g., Visa®, MasterCard®), and may be part of a card payment network 140. An issuing bank may issue credit cards to buyers and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

While FIG. 1 illustrates merchants 102 sending the transaction data directly to the payment service 108 as part of the request to authorize the payment instrument, in some instances other entities (e.g., banks associated with the merchants or with customer payment instruments) may provide transaction data, such as part of a batched, periodic process.

While customer profiles 132 may store indications of user preferences, merchant profiles 130 may store information associated with respective ones of the merchants 102. For instance, the merchant profiles 130 may indicate a class of items offered by respective merchants (e.g., coffee items, collectibles, apparel, etc.), a type of business of the merchant (e.g., restaurant, coffee shop, retail store, etc.), a geographical location of the merchant, and the like.

In some instances, a computing device associated with the merchant (e.g., POS device 105, servers of the merchant, etc.) may determine when the customer visits physical premises or a digital presence of the merchant. For instance, the device 103 of the customer 104 may include an application (e.g., an application provided by payment service 108) that communicates with POS device 105 of merchant 102 via near-field communication methods (e.g., Bluetooth, etc.). Therefore, when the customer visits the physical premises of merchant 102, for example, POS device 105 may detect the presence of customer device 103. The POS device may accordingly determine that the customer is present. In another example, one or both of POS device 105 and customer device 103 may share its location (e.g., GPS coordinates) to a common service for determining when the devices are located within a threshold proximity of one another, and for mediating a transaction between customer device 103 and POS device 105.

In another example, customer 104 may utilize customer device 103 to "check in" at the merchant location, and POS device 105 may receive an indication of this check in. When the customer visits a digital presence of merchant 102 (e.g., a website, etc.), customer 104 may log in or otherwise provide information (e.g., a cookie on the device 103) from which the merchant determines that the customer is at the merchant. Of course, while a few examples are listed, it is to be appreciated that the merchant and/or payment service 108 may determine when the customer is present at the merchant in any other number of ways. In each instance, after payment service 108 receives an indication that customer 104 is located at merchant 102, the payment service 108 may determine whether to send one or more previously expressed item preferences of the customer to the merchant.

In addition, customer 104 may desire to receive an instance of a payments application, such as a mobile wallet application, from the payment service 108. FIG. 1 illustrates, at 118, that the customer 104 may send payment-application requests to payment service 108. In response, at 120, payment service 108 may provide instances of the application back to customer device 103. In addition, payment service 108 may map an identification of the instance of the application to the customer profile.

Figure 2A:
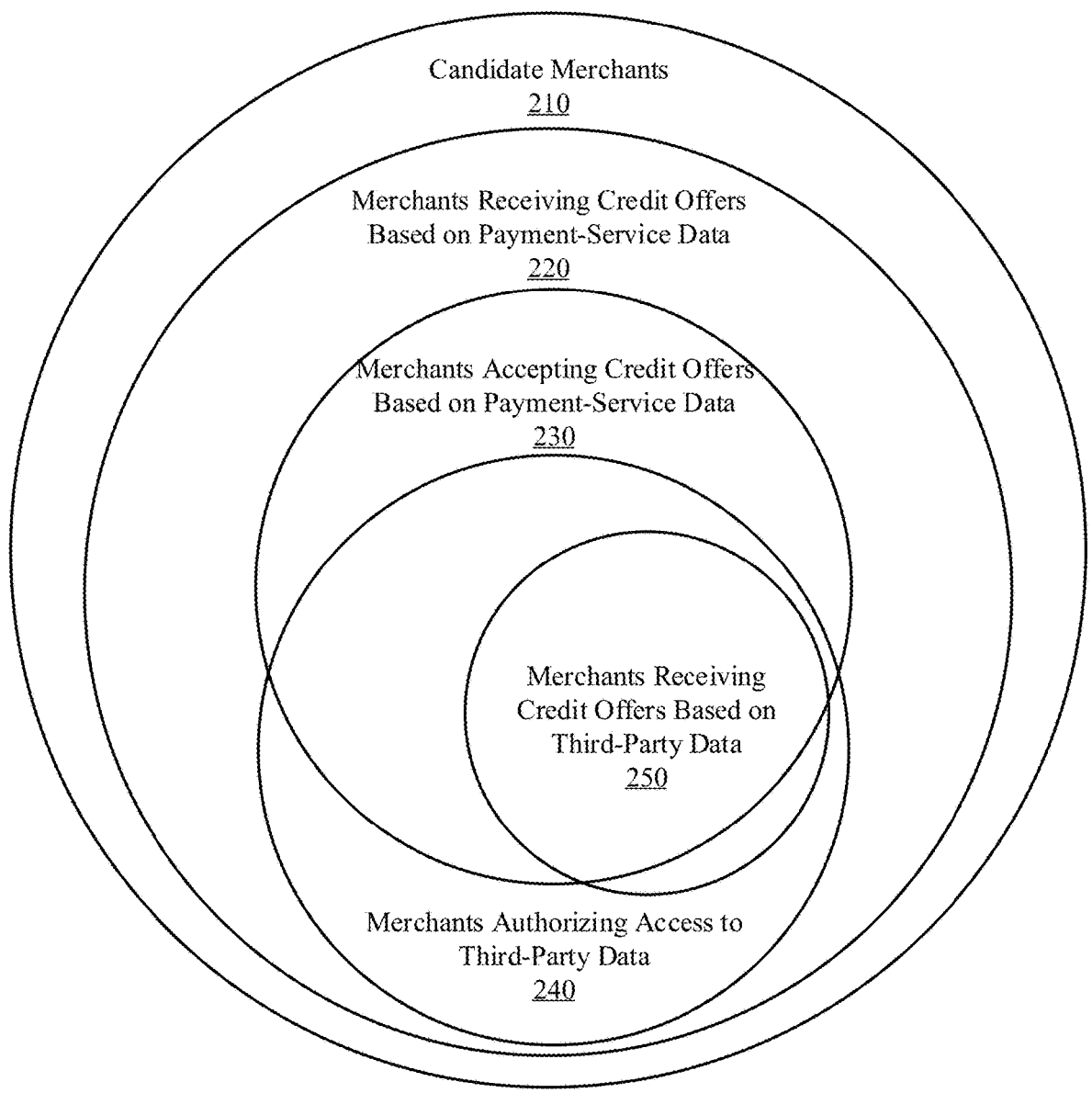
FIGS. 2A-2B illustrate example sets of merchants that are candidate recipients of credit offers.
Figure 2B:
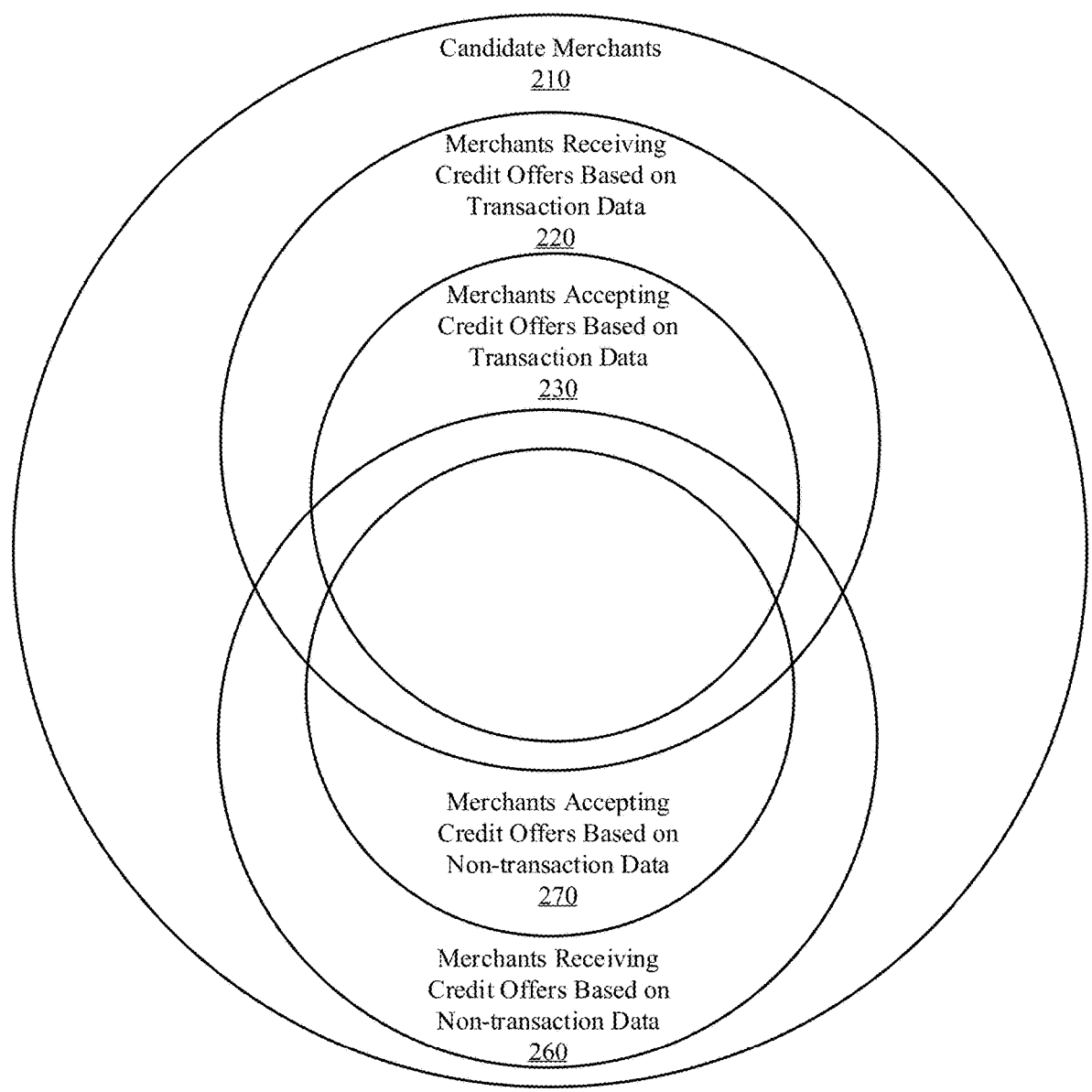

FIGS. 2A-2B illustrate example sets of merchants that are candidate recipients of credit offers. In particular embodiments, the payment service system may select a set of candidate merchants 210 for potential credit offers from all merchants using the payment service. The payment service system may select the candidate merchants 210 by applying one or more filters each corresponding to a criterion. The criterion may be related to, for example, an age of a merchant, a business sector a merchant is in, a location of a merchant, a size of a merchant, a use history of the payment service by a merchant, an owner of a merchant, a customer base of a merchant, a type of company formation associated with a merchant, other suitable characteristics of a merchant, or any combination thereof. The payment service may recognize a merchant as a candidate merchant 210 if the merchant satisfies a required number of the criteria.

In particular embodiments, the payment service system may select a set of merchants 220 to send offers of credit to from the candidate merchants 210. The payment service system may calculate a probably of default for each of the candidate merchants 210 using a risk model. For each candidate merchant, the risk model may take as input one or more transactions associated with the merchant that are processed and stored by the payment service system. The input may further comprise other suitable information associated with the merchant. The risk model may return an output representing an estimate of the merchant's likelihood of default on a potential loan from the payment service system. The likelihood of default may be represented by a probability or percentage value (e.g., 10%, 20%, 30%). The payment service system may compare the calculate probability of default for a particular merchant with a threshold value (e.g., 15%). Any merchant whose probability of default is below the threshold value may be allocated to the set 220 and receive an offer of credit from the payment service system. The offer of credit may comprise a credit limit that is calculated based on the transactions processed and stored by the payment service system. The payment service system may decline to extend credit to any merchant whose probability of default is greater than the threshold value. In particular embodiments, each of a subset of merchants 230 of the set 220 may accept the offer of credit and take a loan from the payment service within the merchant's respective credit limit.

In particular embodiments, as illustrated by FIG. 2A, the payment service system may determine that a plurality of merchants of the set 220 may have additional revenue from transactions recorded by one or more third-party systems rather than the payment service system. The payment service system may request access to data associated with the merchants stored by the third-party systems. A set of the merchants 240 may have granted the payment service system access to the data stored by third-party systems. For each of the merchants in the set 240, the payment service system may access data stored by the third-party systems to identify one or more transactions associated with income of the merchant 240. The payment service system may calculate an estimate of any additional income of the merchant represented by these transactions based on a risk model and determine whether to extend to the merchant any additional credit. The payment service system may determine a subset of the merchants 250 are entitled to additional credit and may send these merchants 250 an updated offer of credit based on the transactions stored by the payment service system as well as the transactions stored by third-party systems.

In addition, the payment service system may use the additional transaction data obtained from the third-party systems to update the risk model in general, or update a risk model for that specific merchant or for all merchants of a specific classification (merchants with the same classification code, location, merchant with similar chargebacks, similar debt, employee count, etc.). Furthermore, through analysis, by the payment service, of the merchant's additional income streams from third party systems, the payment service may also determine an optimal time to collect payment from the merchant for repayment of the loan amount. The payment service may withhold portions of transactions conducted at the point of sale (via an application associated with the payment service) of the merchant for repayment of the loan amount, but may also modify or customize the timing for withholding funds from POS transactions based on the additional third-party income or non-transaction data (e.g., change to once a week or bi-weekly collection rather than daily).

In particular embodiments, as illustrated by FIG. 2B, the payment service system may access non-transaction data associated with a plurality of merchants stored by the payment service system. The payment service may adjust its estimate of the income of each merchant based on the non-transaction data and determine that one or more merchants 260 are entitled to additional credit based on the non-transaction data. The payment service system may send these merchants 260 an updated offer of credit based on transaction and non-transaction data. A subset of merchants 270 may accept the updated offer of credit. Although FIGS. 2A-2B illustrate particular merchants assigned to particular sets, this disclosure contemplates any suitable merchants assigned to any suitable sets.

Figure 3A:
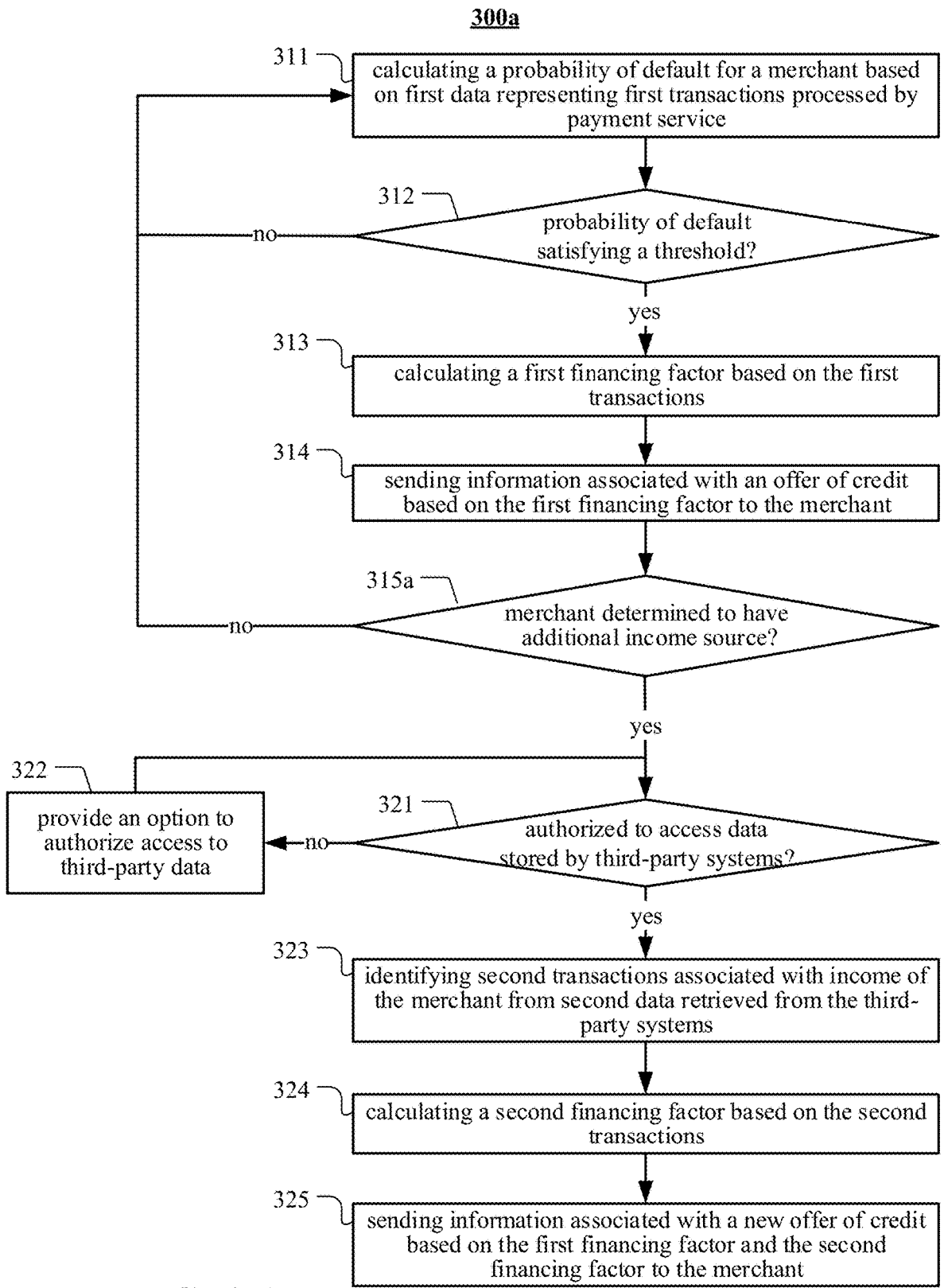
FIG. 3A illustrate an example method for updating an offer of credit to a merchant based on data obtained from one or more third-party systems.

FIG. 3A illustrate an example method 300a for updating an offer of credit to a merchant based on data obtained from one or more third-party systems. The steps of the method 300a may be performed proactively and regularly, so that an up-to-date offer of credit can be provided to a merchant as an instant decision. The method may begin at step 311, where a payment service system may calculate, using a risk model, a probability of default for a merchant based on first transaction data representing a plurality of first transactions associated with the merchant. The first transactions are processed by the payment service system. At step 312, the payment service system may determine whether the probability of default for the merchant satisfies a threshold. If not, the process may return to step 311. In particular embodiments, the payment service system may periodically recalculate a merchant's probability of default to assess the merchant's eligibility for a loan. If the probability of default for the merchant does satisfy the threshold, the payment service system may proceed to step 313, where the payment service system may calculate, using the risk model, a first financing factor based on the first transactions associated with the merchant. In particular embodiments, the first financing factor may represent a measure of the income of the merchant. The risk model may take as input a plurality of income factors (e.g., average monthly amount of deposits, standard deviation). It may have been trained using supervised learning based on inputs from one or more human agents on existing transactions. As an example and not by way of limitation, the first financing factor may correspond to a gross payment volume (GPV) associated with the merchant. The GPV value may represent a total amount of payments received by the merchant from its customers. The first financing factor may correspond to a particular time period (e.g., one month, one week, one year). The first financing factor may be calculated as an average value of multiple time periods. The first financing factor may also be calculated as a prediction of a future value using regression analysis based on past values.

At step 314, the payment service system may send information associated with an offer of credit to a computing device associated with the merchant. The offer of credit may be generated based on the first financing factor. In particular embodiments, a value of the offer of credit may be within a credit limit. The credit limit may be computed as a function of the first financing factor. In particular embodiments, the credit limit may be determined by multiplying the first financing factor with a particular constant. As an example and not by way of limitation, the payment service may decide to extend credit up to 10% of the annual GPV of a merchant. If a particular merchant has an expected GPV of $120,000, the payment service system may calculate the credit limit for the merchant by multiplying $120,000 by 10% to get $12,000. The payment service system may send to the merchant one or more offers of credit each for a value equal to or smaller than $12,000. For example, the payment service system may send to the merchant offers of credit for the values of $12,000, $10,000, and $8,000.

In particular embodiments, after the payment service system send information associated with an offer of credit to the computing device associated with the merchant, it may or may not receive a message indicating acceptance of the offer of credit from the merchant. At step 315a, the payment service system may determine whether the merchant is likely to have additional revenue from transactions recorded by one or more third-party systems rather than the payment service system. If so, the payment service system may proceed to step 321 and determine whether additional credit can be extended to the merchant based on data stored by third-party systems. Before making the determination regarding additional credit, the payment service system may also verify that the merchant is not bound by an existing credit offer. For example, if the merchant has accepted the offer of credit send at step 314, the payment service system may refrain from sending the merchant additional credit information before the merchant has repaid the entirety of the existing loan or at least a required percentage (e.g., 75%) of the existing loan. If the merchant is determined not to have additional revenue, the payment service system may return to step 311. Alternatively or additionally, the payment service system may make another determination at this step (illustrated as step 315b in FIG. 3B). The payment service system may detect an indication of interest in the offer of credit for the merchant. As an example and not by way of limitation, the payment service system may determine whether the merchant has activated a notification link associated with the offer of credit sent at step 314. The notification link may be included in an email or displayed in a user interface (e.g., merchant account dashboard) associated with the payment service system. The payment service system may determine whether it has access to third-party systems associated with the merchant only if the merchant has expressed interest in the existing offer by activating the notification link. In particular embodiments, the payment service system may periodically re-calculate a merchant's probability of default to assess the merchant's eligibility for a loan. Based on the assessment, the payment service system may maintain, modify, or cancel existing offers of credit made to the merchant.

At step 321, the payment service system may confirm whether authorization has been obtained to access data stored by one or more third-party systems associated with the merchant. The third-party systems may comprise, for example, one or more banks, one or more payment processing services, one or more e-commerce platforms, other suitable third-party systems, or any combination thereof. In particular embodiments, the payment service system may determine that the merchant has income not related to the first transactions before attempting to access data stored by third-party systems. The payment service system may comprise or be associated with one or more data stores storing information associated with one or more accounts of one or more merchants with third-party systems. The information for a particular merchant may comprise credentials for logging in an account of the merchant with a third-party system. The payment service system may confirm whether authorization has been obtained to access data stored by a particular third-party system by checking whether the merchant's credentials required for logging in a particular third-party system are stored by at least one of the data stores. If the payment service system determines that the merchant has not provided authorization to access third-party data, it may proceed to step 322, where it may send an option to authorize access to third-party financial data associated with the merchant to a user interface associated with the merchant. In response, the payment service system may or may not receive a message comprising security credentials for accessing one or more third-party systems from the merchant. It may store any security credentials received from a merchant in the one or more data stores. After step 322, the payment service system may return to step 321 after a particular period of time to confirm whether authorization has been obtained to access third-party data. If the payment service system determines that authorization has been obtained to access necessary third-party data, it may proceed to step 323.

At step 323, the payment service system may identify a plurality of second transactions associated with income of the merchant from second transaction data retrieved from one or more of the third-party systems. In particular embodiments, the payment service system may gain access to the third-party systems using security credentials received from the merchant. The third-party systems may make available a plurality of types of data. At least part of the data may represent a plurality of second transactions associated with the merchant (e.g., a bank account statement containing a summary of transactions). The payment service system may retrieve information associated with the transactions and analyze the transactions to identify those that provide evidence as to the merchant's income with some required level of reliability. In particular embodiments, the payment service system may select at least one of the second transactions for analysis and calculation in subsequent steps based on information associated with the second transactions. The payment service system may use one or more text recognition techniques (e.g., fuzzy matching) to identify relevant second transactions.

As an example and not by way of limitation, the payment service system may select one or more second transactions each corresponding to a deposit from one of a plurality of chosen sources to an account of the merchant associated with one of the third-party systems. For example, the merchant may provide its goods or services for sale on one or more e-commerce sites. The e-commerce sites may collect payments for the merchant and periodically deposit any money it holds for the merchant to a bank account associated with the merchant. The bank may record these deposits as well as their sources. The payment service system may recognize the deposits from particular e-commerce sites as a reliable indication of the merchant's income and select the corresponding transactions.

As another example and not by way of limitation, the payment service system may select one or more second transactions each conforming to a recurring pattern. For example, the payment service may recognize recurring income of the merchant as supporting credit offers to the merchant. The payment service system may process data retrieved from a third-party system and identify one or more patterns from the transactions recorded by the third-party system. The patterns may include, for example, a monthly deposit of a value within a particular range. The payment service system may identify one or more transactions from the second transactions that conform to this pattern and use the identified transactions for further calculations.

In particular embodiments, the payment service system may apply one or more filters to eliminate one or more of the second transactions from consideration. As an example and not by way of limitation, the payment service system may filter out one or more second transactions determined to be outliers. For example, the second transactions may comprise one transaction of a value $10,000, while all other transactions are below $1,000. The one transaction may be eliminated from consideration because its value is an outlier and it is unlikely to be repeated. As another example and not by way of limitation, the payment service system may exclude one or more second transactions determined to be related to suspicious activities. As an example and not by way of limitation, the second transactions may comprise a deposit to a bank account and a withdrawal of the same amount one day later. The payment service system may exclude the deposit from consideration as income.

At step 324, the payment service system may calculate, using the risk model, a second financing factor based on at least one of the second transactions. In particular embodiments, the second financing factor may represent a measure of additional income of the merchant as determined based on transactions recorded by third-party systems. The risk model may take as input a plurality of income factors (e.g., average monthly amount of deposits, standard deviation). It may have been trained using supervised learning based on inputs from one or more human agents on existing transactions. As an example and not by way of limitation, the second financing factor may correspond to a GPV associated with the merchant as recorded by the third-party systems. The second financing factor may correspond to a particular time period (e.g., one month, one week, one year). The second financing factor may be calculated as an average value of multiple time periods. The second financing factor may also be calculated as a prediction of a future value using regression analysis based on past values.

In particular embodiments, the payment service system may consider one or more other factors in calculating the second financing factor. As an example and not by way of limitation, it may access information associated with one or more loans or savings accounts associated with the merchant from the second transaction data and calculate the second financing factor based further one the information associated with the loans or savings. For example, the payment service system may reduce a credit limit for a merchant if the merchant has taken significant loans from another entity. The payment service system may increase a credit limit for the merchant if the merchant has substantial savings that is likely available for repaying loans offered by the payment service.

At step 325, the payment service system may send information associated with a new or modified offer of credit to the computing device associated with the merchant for display. The payment service system may generate the new offer of credit or modify or update the existing offer of credit based on the first financing factor and the second financing factor. In particular embodiments, a value of the new or modified offer of credit may be within an updated credit limit. The updated credit limit may be computed as a function of the first financing factor and the second financing factor. As an example and not by way of limitation, the payment service system may determine that the merchant has an expected GPV of $80,000 from payments not processed by the payment service system. It may add the $80,000 value to a previously computed GPV (or the first financing factor) of $120,000 to obtain a total GPV of $200,000. The credit limit for the merchant may be increased to 20,000, which is 10% of the updated total GPV.

Although this disclosure describes and illustrates particular steps of the method of FIG. 3A as occurring in a particular order, this disclosure contemplates any suitable steps of the method of FIG. 3A occurring in any suitable order. Moreover, although this disclosure describes and illustrates an example method for updating an offer of credit to a merchant based on data obtained from one or more third-party systems including the particular steps of the method of FIG. 3A, this disclosure contemplates any suitable method for updating an offer of credit to a merchant based on data obtained from one or more third-party systems including any suitable steps, which may include all, some, or none of the steps of the method of FIG. 3A, where appropriate. Furthermore, although this disclosure describes and illustrates particular components, devices, or systems carrying out particular steps of the method of FIG. 3A, this disclosure contemplates any suitable combination of any suitable components, devices, or systems carrying out any suitable steps of the method of FIG. 3A.

Figure 3B:
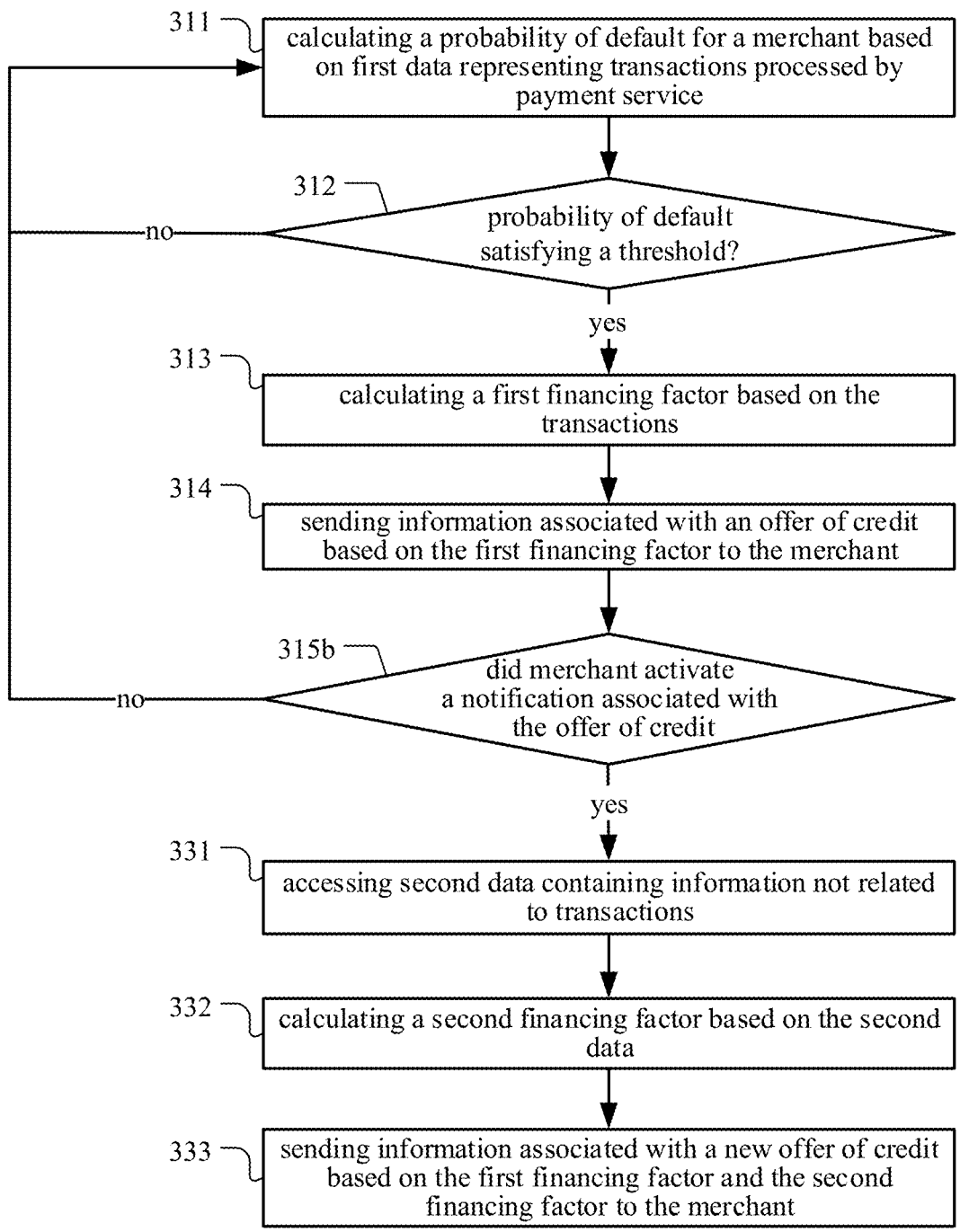
FIG. 3B illustrate an example method for updating an offer of credit to a merchant based on non-transaction data associated with the merchant.

FIG. 3B illustrate an example method 300b for updating an offer of credit to a merchant based on non-transaction data associated with the merchant. The steps of the method 300a may be performed proactively and regularly, so that an up-to-date offer of credit can be provided to a merchant as an instant decision. The example method 300b may comprise steps 311-314 that are identical or similar to those described for the example method 300a. In particular, at step 314, the payment service system may send information associated with an offer of credit to a computing device associated with a merchant. The offer of credit may be generated based on first transaction data representing transactions recorded by the payment service system. At step 315b, it may determine whether the merchant has activated a notification link associated with the offer of credit sent at step 314. The notification link may be included in an email or displayed in a user interface (e.g., merchant account dashboard) associated with the payment service system. If so, the payment service system may proceed to step 331 and determine whether additional credit can be extended to the merchant based on non-transaction data associated with the merchant. If not, the payment service system may return to step 311 to re-assess the merchant's eligibility for an offer of credit.

At step 331, the payment service system may access second transaction data containing information associated with the merchant that is not related to the transactions processed and stored by the payment service system. In particular embodiments, the payment service system may offer one or more additional services (other than processing payments) to a merchant. The payment service system may use information associated with one or more of the additional services to improve its decision-making related to extending credit to merchants. The information may not be related to transactions as discussed above, but may comprise information about one or more appointments made by the merchant, information about a payroll of the merchant, information about an inventory of the merchant, information about one or more marketing activities of the merchant, information about a customer base of the merchant, or information about one or more instant deposits to an account associated with the merchant. In particular embodiments, the second transaction data may further be obtained from one or more third-party systems. The payment service system may access data stored by the third-party systems for a particular merchant using authorization granted by the respective merchant. In particular embodiments, one or more third-party systems may each provide merchants with one or more services including, for example, tax filing, accounting, auditing, and credit reporting. One or more third-party systems may provide study or research reports about companies. In particular embodiments, the data retrieved from one or more third-party systems may comprise, for example, information about tax filings by the merchant, information about accounting by the merchant, information about a credit history of the merchant, information about one or more business events associated with the merchant (e.g., foreclosure, bankruptcy), information about an owner of the merchant, information about a cashflow of the merchant, other suitable information, or any combination thereof.

At step 332, the payment service system may calculate, using the risk model, a second financing factor based on at least a portion of the second transaction data. In particular embodiments, the second financing factor may represent a measure of additional income of the merchant as determined based on non-transaction data. As an example and not by way of limitation, the second financing factor may correspond to a GPV associated with the merchant estimated based on non-transaction data. The second financing factor may correspond to a particular time period (e.g., one month, one week, one year). The second financing factor may be calculated as an average value of multiple time periods. The second financing factor may also be calculated as a prediction of a future value using regression analysis based on past values.

In particular embodiments, the second transaction data may be used to supplement the first transaction data in calculating the second financing factor. As an example and not by way of limitation, the payment service system may have recorded a large number of appointments for a merchant that is a service provider without recording a comparable number of payments to the merchant. The payment service system may determine that customers tend to make payments to the merchants using methods of payments not related to the payment service (e.g., cash payments). The payment service system may increase a credit limit for the merchant according to an estimated value of payments associated with each appointment. In particular embodiments, the second transaction data may be used to check the first transaction data. As an example and not by way of limitation, the payment service may have recorded a large number of payments for a merchant in a particular year. However, the payment service system may check and determine that the merchant has only paid a small amount of tax inconsistent with typical profits a merchant would have made from the number of payments. The payment service system may reduce the credit limit for the merchant according to such inconsistency. In particular embodiments, to calculate the second financing factor, the payment service system may compare the second transaction data associated with a particular merchant with similar data for one or more other merchants determined to be similar to the merchant. As an example and not by way of limitation, the payment service system may have granted a first retailer a particular credit limit. The payment service system may compare an inventory for a second retailer with that of the first retailer to determine the size and revenue of the second retailer as compared with the first retailer. The payment service system may calculate a credit limit for the second retailer based on the comparison.

At step 333, the payment service system may send, to the computing device associated with the merchant, information associated with a new or modified offer of credit. The payment service system may generate the new offer of credit or modify or update the existing offer of credit based on the first financing factor and the second financing factor. In particular embodiments, a value of the new or modified offer of credit may be within an updated credit limit. The updated credit limit may be computed as a function of the first financing factor and the second financing factor. In particular embodiments, the new or modified offer of credit may be generated further based on a size of the merchant or a business sector associated with the merchant. The payment service system may favor merchants of some required size or merchants operating in particular industries over other merchants in terms of extending credit. In particular embodiments, the new or modified offer of credit may be generated further based on a current market condition for businesses similar to the merchant. The payment service system may recognize temporal or seasonable fluctuation of market conditions for particular merchants and adjust the merchants' credit limits according to such consideration.

Although this disclosure describes and illustrates particular steps of the method of FIG. 3B as occurring in a particular order, this disclosure contemplates any suitable steps of the method of FIG. 3B occurring in any suitable order. Moreover, although this disclosure describes and illustrates an example method for updating an offer of credit to a merchant based on non-transaction data associated with the merchant including the particular steps of the method of FIG. 3B, this disclosure contemplates any suitable method for updating an offer of credit to a merchant based on non-transaction data associated with the merchant including any suitable steps, which may include all, some, or none of the steps of the method of FIG. 3B, where appropriate. Furthermore, although this disclosure describes and illustrates particular components, devices, or systems carrying out particular steps of the method of FIG. 3B, this disclosure contemplates any suitable combination of any suitable components, devices, or systems carrying out any suitable steps of the method of FIG. 3B.

Figure 4A:
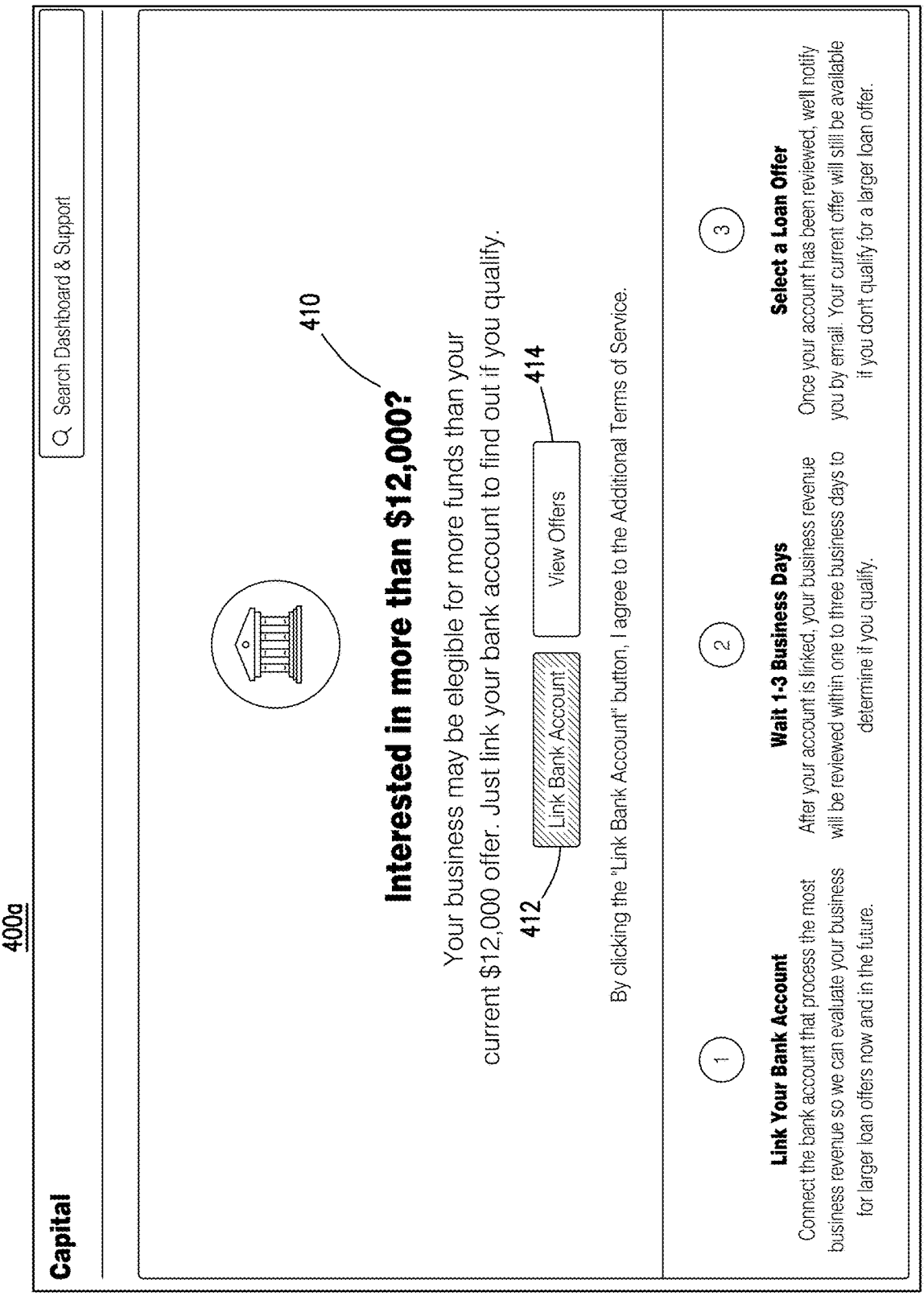

FIGS. 4A-4H illustrate example user interfaces for obtaining data associated with a merchant stored by third-party systems and updating offers of credit based on the data. As illustrated by FIG. 4A, the payment service system may send a user interface 400a to a computing device associated with a merchant for display. The payment service system may have calculated a credit limit of $12,000 for a particular merchant based on transactions associated with the merchant that are processed and stored by the payment service system. The user interface 400a may comprise a message 410 informing the merchant that the merchant may be eligible for additional credit by linking one or more bank accounts. The user interface 400a may also comprise a button 412 corresponding to a user interface for linking bank accounts of the merchant and a button 414 corresponding to a user interface for viewing the current offers for the merchant. If the merchant clicks on the button 414, the payment service system may send the user interface 400b to the computing device associated with the merchant for display. If the merchant clicks on the button 412, the payment service system may send the user interface 400c to the computing device associated with the merchant for display.

In particular embodiments, the payment service system may selectively display the message 410 and the button 412 to merchants determined to be likely to have income or revenue other than that associated with transactions processed by the payment service system. In particular embodiments, the payment service system may use one or more machine-learning or artificial-intelligence techniques to determine the likelihood that a particular merchant has outside income. To make the determination, the payment service system may access, retrieve, process, and analyze data including but not limited to transactions by the merchant that are processed by the payment service system, a merchant category code (MCC) of the merchant, a location of the merchant, an age of the merchant, an ownership status of the merchant, information about payroll or workforce of the merchant, information about an inventory of the merchant, information about a customer base of the merchant, information about one or more appointments made by the merchant with its customers, other suitable data, or any combination thereof. The payment service system may also compare data about the merchant with that of one or more other merchants determined to be similar.

As an example and not by way of limitation, the payment service system may provide an offer of credit to a bagel shop. The payment service system may determine that the bagel shop has a certain number of employees (e.g., five) and that it has a premium location (e.g., financial district of San Francisco). Based on such information, the payment service system may estimate operation expenses for the bagel store (e.g., $50,000 per month). This estimation may be based on public information (e.g., average salary for restaurant workers, average rent for the location), income or revenue information for other bagel shops of a similar size and comparable location, or other suitable information. The payment service system may compare the estimated operation expenses with an income of the bagel shop as determined based on transactions processed by the payment service system. If the income as calculated based on these transactions is unlikely to cover the operation expenses, the payment service system may determine that there is a high likelihood that the bagel shop has income from transactions processed by third-party systems other than the payment service system. Based on this determination, the payment service system may provide for display in the user interface 400a or another suitable user interface associated with the merchant the message 410 and the button 412. In particular embodiments, the payment service system may determine whether the estimated additional income exceeds a particular threshold, and provide the message 410 and the button 412 for display only if the additional income exceeds the threshold.

As illustrated by FIG. 4B, the user interface 400b may comprise one or more existing credit offers 424. The payment service system may offer the merchant loans of different amounts (e.g., $12,000, $10,000, $8,000) within a credit limit (e.g., $12,000). Each credit offer 424 displayed may set out, for example, the cost of the loans, the method of repayment (e.g., automatically taking a portion of future transaction proceeds), a total amount owned. Each credit offer 424 may comprise a button 426, which if the merchant click on, would allow the merchant to request a loan associated with the respective credit offer 424. The user interface 400b may also comprise a message 420 informing the merchant that additional credit may be requested by linking one or more bank accounts. The message 420 may comprise a button 422 linking to the user interface 400c.

Figure 4C:
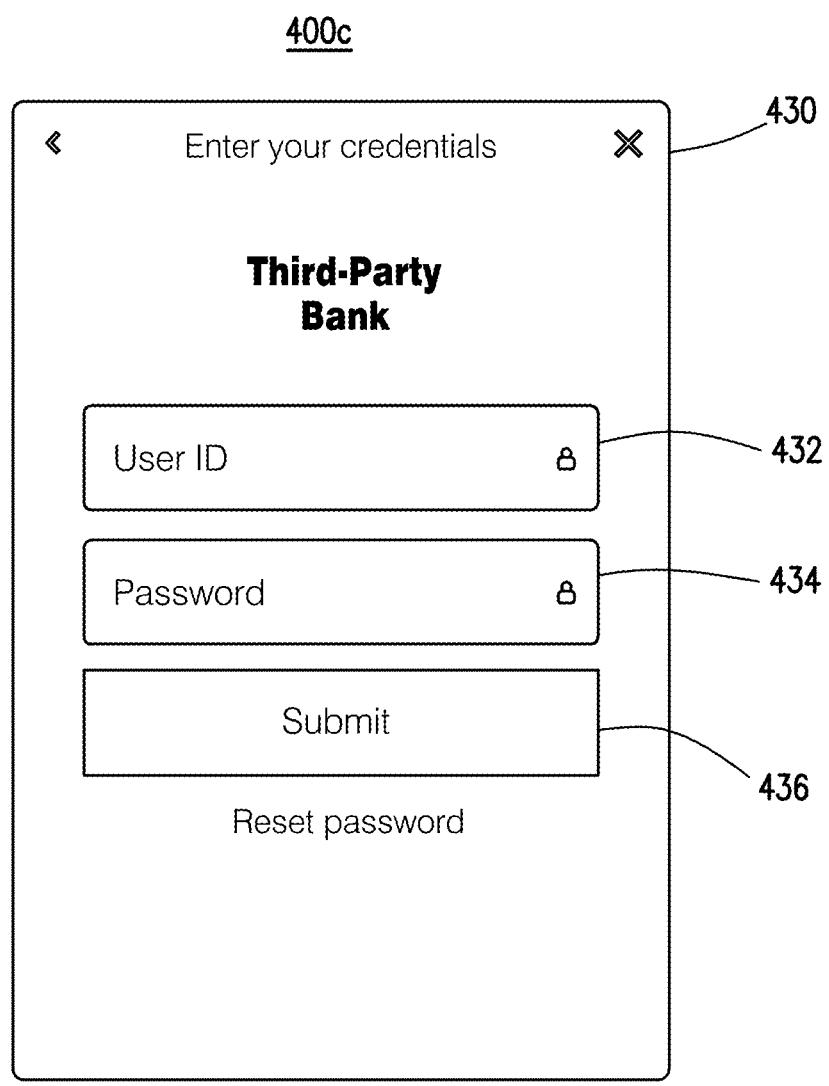

As illustrated by FIG. 4C, if the computing device associated with the merchant send to the payment service system an input indicating willingness to provide the payment service system access to data stored by third-party systems, the payment service system may send the user interface 400c to the computing device associated with the merchant for display. The user interface 400c may comprise a window 430 associated with a third-party system. The window 430 may comprise field 432 and 434 for inputting login credentials for an account associated with the merchant with the third-party system. The merchant may click on the button 436 to send the credentials to the payment service system, thus providing authorization to access data stored by the third-party system. When such authorization is provided, the payment service system may send a user interface 400d or a user interface 400e to the computing device associated with the merchant for display.

Figure 4F:
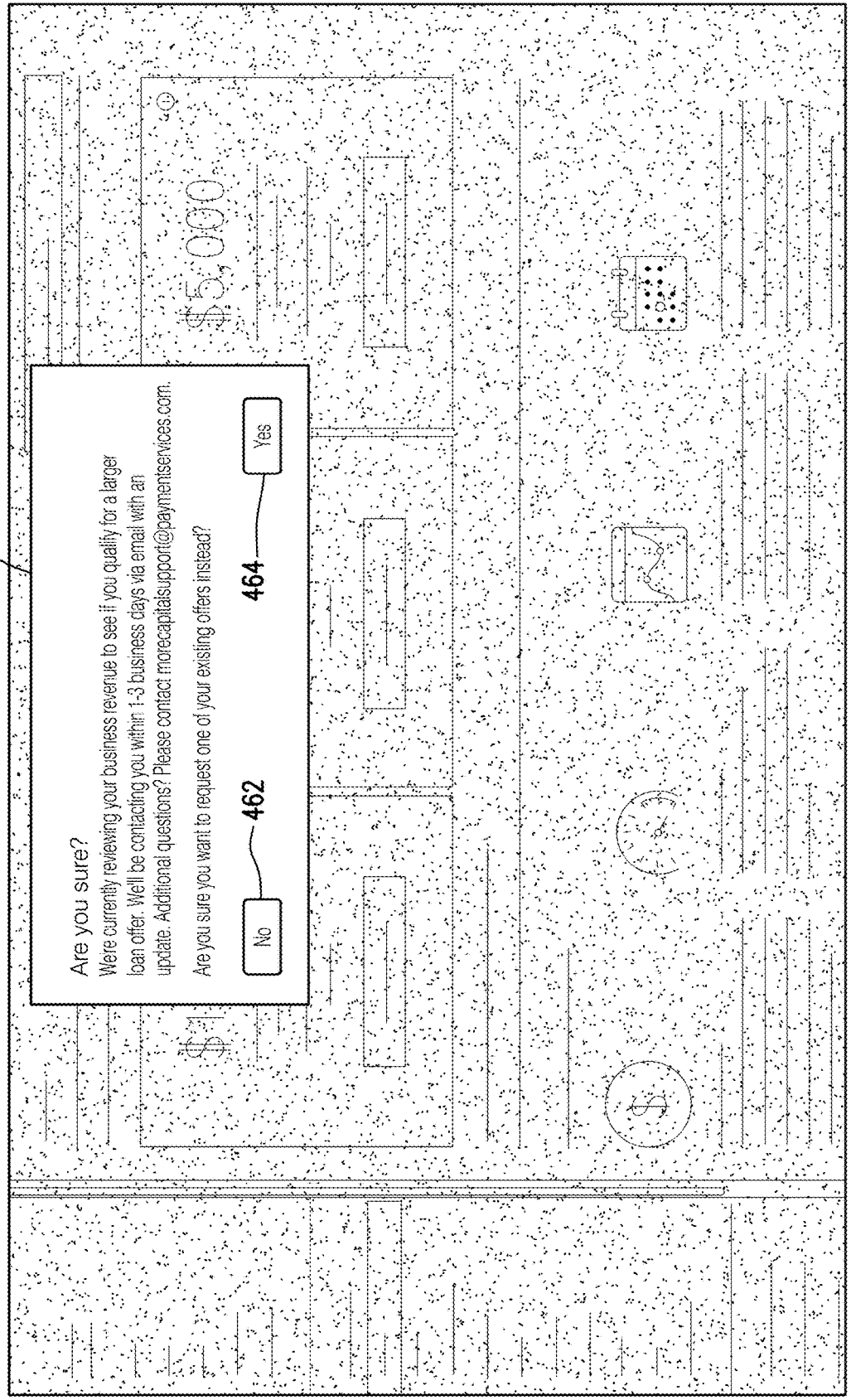

As illustrated by FIG. 4D, the user interface 400d may comprise a message 440 indicating that data associated with a merchant that is stored by a third-party system is being reviewed for eligibility for additional credit. As illustrated by FIG. 4E, the user interface 400e may comprise one or more existing credit offers 424 and a message 450 indicating that data associated with a merchant that is stored by a third-party system is being reviewed for eligibility for additional credit. If the merchant selects one of the existing offers, however, the payment service system may send the user interface 400f to the computing device associated with the merchant for display. As illustrated by FIG. 4F, the user interface 400f may comprise a message 460 informing the merchant that additional data is reviewed for eligibility for additional credit and asking the merchant whether to proceed to request for one of the existing offers. The user interface may comprise buttons 462 and 464 allowing the merchant to select whether to proceed with one of the existing credit offers.

As illustrated by FIG. 4G, if existing offers of credit for a merchant are updated based on data stored by one or more third-party systems, the payment service system may send a user interface 400g to the computing device associated with the merchant for display. The user interface 400g may comprise a message 470 informing the merchant that additional credit has been approved based on third-party data. The user interface 400g may comprise one or more new or modified offers 474. The new or modified offers 474 may each be within an updated credit limit (e.g., $20,000) calculated for the merchant. The updated credit offers 474 may each contain details such as a value of the offer, a borrowing cost, a repayment method (e.g., automatically taking a portion of future transaction proceeds), a total amount owned. The updated credit offers 474 may each further contain a value of a previous offer for reference. Each updated credit offer 474 may comprise a button 476, which if the merchant click on, would allow the merchant to request a loan associated with the respective credit offer 474.

As illustrated by FIG. 4H, if a merchant is determined to not be eligible for additional credit based on data stored by one or more third-party systems, the payment service system may send a user interface 400h to the computing device associated with the merchant for display. The user interface 400h may comprise a message 480 informing the merchant that the merchant is not qualified for an increased loan offer. The user interface 400h may comprise the existing offers 424. Although FIGS. 4A-4H illustrate particular user interfaces for obtaining data associated with a merchant, this disclosure contemplates any suitable user interfaces for any suitable purposes.

Figure 5:
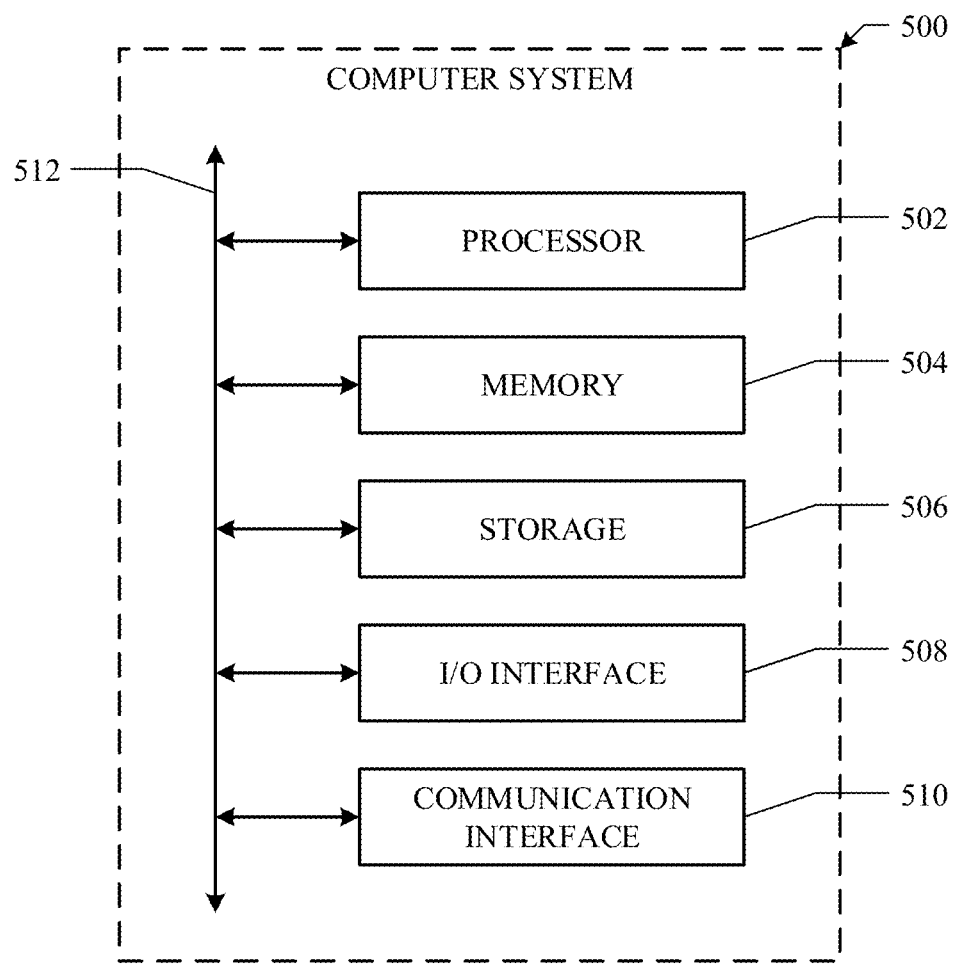
FIG. 5 illustrate an example computer system.

FIG. 5 illustrates an example computer system 500. The computer system 500 may be a computer system associated with the payment service 108, POS device 105, or customer device 103. While these devices may have components in common, such as those illustrated in FIG. 5, it should be appreciated that each of the payment service system 108, POS device 105, or customer device 103 may be specialized devices configured for their specific purposes. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate.

Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for generating credit offers for a plurality of merchants having accounts with a payment service, the method comprising:
    receiving, by one or more computing devices of the payment service and from a plurality of merchant devices, transaction data associated with a plurality of payment transactions associated with the plurality of merchants having accounts with the payment service, wherein each merchant device of the plurality of merchant devices has installed thereon an instance of a merchant application configuring the respective merchant device as a point-of-sale terminal for generating the transaction data and transmitting the transaction data to the payment service;
    processing, by the one or more computing devices of the payment service and based at least in part on the transaction data, payment for the plurality of payment transactions on behalf of the plurality of merchants;
    determining, by the one or more computing devices of the payment service and using a risk model, a probability of default for a merchant of the plurality of merchants, wherein the risk model operates based at least in part on a portion of the transaction data corresponding to the merchant;
    determining, by the one or more computing devices of the payment service and at a first time, that the probability of default for the merchant satisfies a threshold;
    calculating, by the one or more computing devices of the payment service, using the risk model and based at least in part on the probability of default satisfying the threshold, a first financing factor based at least in part on the portion of the transaction data corresponding to the merchant, wherein the first financing factor represents a first measure of income of the merchant;
    generating, by the one or more computing devices of the payment service and based on the first financing factor, a first credit offer for the merchant;
    accessing, by the one or more computing devices of the payment service and based at least in part on a determination that a response to the first credit offer has not been received, a first portion of interaction data associated with the merchant and stored by the payment service, wherein the portion of the interaction data indicates interactions between the merchant and at least one of an appointment service, a payroll service, or an inventory service;
    predicting, by the one or more computing devices of the payment service and based at least in part on the portion of the interaction data, additional revenue of the merchant;
    calculating, by the one or more computing devices of the payment service using the risk model, a second financing factor based at least in part on the predicted additional revenue of the merchant, wherein the second financing factor represents a second measure of income of the merchant;
    determining, by the one or more computing devices of the payment service and at a second time after the first time, that the probability of default for the merchant satisfies the threshold;
    generating, by the one or more computing devices of the payment service and based at least in part on the probability of default for the merchant satisfying the threshold at the second time, a second credit offer based at least in part on the first financing factor and the second financing factor, wherein the second credit offer is different from, and replaces, the first credit offer;
    causing, by the one or more computing devices of the payment service, a user interface including information associated with the second credit offer to be displayed via the merchant device;
    receiving, by the one or more computing devices of the payment service and via the user interface, an indication of an acceptance of the second credit offer; and
    causing, based at least in part on receiving the indication of the acceptance of the second credit offer, an amount of funds associated with the second credit offer to be transferred to an account of the merchant, wherein at least a portion of the funds are repaid to the payment service from funds withheld from proceeds of one or more future transactions associated with at least one of the payment service, the appointment service, the payroll service, or the inventory service.

2. The method of claim 1, wherein the portion of the interaction data includes information that comprises one or more of:
    information about one or more appointments made by the merchant;
    information about a payroll of the merchant;
    information about an inventory of the merchant;
    information about one or more marketing activities of the merchant;
    information about a customer base of the merchant; or
    information about one or more instant deposits to the account associated with the merchant.

3. The method of claim 1, wherein the second credit offer is generated further based on:
    a size of the merchant; or
    a business sector associated with the merchant.

4. The method of claim 1, wherein the second credit offer is generated further based on a current market condition for businesses similar to the merchant.

5. The method of claim 1, further comprising:
    retrieving data about the merchant from one or more third-party systems; and
    generating the second credit offer further based on the retrieved data.

6. The method of claim 5, wherein the retrieved data comprise:
    information about tax filings by the merchant;
    information about accounting by the merchant;
    information about a credit history of the merchant; or
    information about one or more business events associated with the merchant.

7. The method of claim 1, wherein the portion of the interaction data comprises a first portion of the interaction data, and wherein the calculating the second financing factor is based at least in part on comparing the first portion of the interaction data with a second portion of the interaction data, wherein the second portion of the interaction data is associated with one or more other merchants determined to be similar to the merchant.

8. A system associated with a payment service comprising:
one or more processors; and
one or more computer-readable non-transitory storage media coupled to one or more of the processors and comprising instructions operable when executed by one or more of the processors to cause the system to:
receive, by one or more computing devices of the payment service and from a plurality of merchant devices, transaction data associated with a plurality of payment transactions associated with a plurality of merchants having accounts with the payment service, wherein each merchant device of the plurality of merchant devices has installed thereon an instance of a merchant application configuring the respective merchant device as a point-of-sale terminal for generating the transaction data and transmitting the transaction data to the payment service;
process, by the one or more computing devices of the payment service and based at least in part on the transaction data, payment for the plurality of payment transactions on behalf of the plurality of merchants;
determine, by the one or more computing devices of the payment service and using a risk model, a probability of default for a merchant of the plurality of merchants, wherein the risk model operates based at least in part on a portion of the transaction data corresponding to the merchant;
determine, by the one or more computing devices of the payment service and at a first time, that the probability of default for the merchant satisfies a threshold;
calculate, by the one or more computing devices of the payment service and, using the risk model, and based at least in part on the probability of default satisfying the threshold, a first financing factor for the merchant based at least in part on the portion of the transaction data associated with the merchant, wherein the first financing factor represents a first measure of income of the merchant;
generate, by the one or more computing devices of the payment service, a first credit offer based at least in part on the financing factor for the merchant;
access, by the one or more computing devices of the payment service and based at least in part on a determination that a response to the first credit offer has not been received, a portion of interaction data associated with the merchant and stored by the payment service, wherein the portion of the interaction data indicates interactions between the merchant and one or more of an appointment service, a payroll service, or an inventory service;
predict, by the one or more computing devices of the payment service and based at least in part on the portion of the interaction data, additional revenue of the merchant;
calculate, by the one or more computing devices of the payment service, using the risk model, a second financing factor based at least in part on the predicted additional revenue of the merchant, wherein the second financing factor represents a second measure of income of the merchant;
generate, by the one or more computing devices of the payment service, a second credit offer for the merchant based at least in part on the first financing factor and the second financing factor, wherein the second credit offer replaces the first credit offer;
cause, by the one or more computing devices of the payment service, the merchant device associated with the merchant to display a user interface including the second credit offer;
receive, by the one or more computing devices of the payment service and via the user interface, an indication of an acceptance of the second credit offer; and
cause, based at least in part on receiving the indication of the acceptance of the second credit offer, an amount of funds associated with the second credit offer to be transferred to an account of the merchant, wherein at least a portion of the funds are repaid to the payment service by funds withheld from proceeds of one or more future transactions associated with at least one of the payment service, the appointment service, the payroll service, or the inventory service.

9. The system of claim 8, wherein the portion of the interaction data includes information that comprises one or more of:
information about one or more appointments made by the merchant;
information about a payroll of the merchant;
information about an inventory of the merchant;
information about one or more marketing activities of the merchant;
information about a customer base of the merchant; or
information about one or more instant deposits to the account associated with the merchant.

10. The system of claim 8, wherein the second credit offer is generated further based on:
a size of the merchant; or
a business sector associated with the merchant.

11. The system of claim 8, wherein the second credit offer is generated further based on a current market condition for businesses similar to the merchant.

12. The system of claim 8, wherein the instructions are further operable when executed by the one or more processors to cause the system to:
retrieve data about the merchant from one or more third-party systems; and
generate the second credit offer further based on the retrieved data.

13. The system of claim 12, wherein the retrieved data comprise:
information about tax filings by the merchant;
information about accounting by the merchant;
information about a credit history of the merchant; or
information about one or more business events associated with the merchant.

14. The system of claim 8, wherein the portion of the interaction data comprises a first portion of the interaction data, and wherein the instructions are further operable when executed by the one or more processors to cause the system to:
compare the first portion of the interaction data with a second portion of the interaction data associated with one or more other merchants determined to be similar to the merchant; and calculate the second financing factor based at least in part on a result of comparing the first portion of the interaction data with the second portion of the interaction data.

15. One or more computer-readable non-transitory storage media associated with a payment service, embodying software that is operable when executed to:
  receive, from a plurality of merchant devices, transaction data associated with a plurality of payment transactions associated with a plurality of merchants having accounts with the payment service, wherein each merchant device of the plurality of merchant devices has installed thereon an instance of a merchant application configuring the respective merchant device as a point-of-sale terminal for generating the transaction data and transmitting at least the transaction data to the payment service;
  process, based at least in part on the transaction data, payment for the plurality of payment transactions on behalf of the plurality of merchants;
  determine, using a risk model, a probability of default for a merchant of the plurality of merchants, wherein the risk model operates based at least in part on a portion of the transaction data corresponding to the merchant;
  determine, at a first time, that the probability of default for the merchant satisfies a threshold;
  calculate, using the risk model, and based at least in part on the probability of default satisfying the threshold, a first financing factor for the merchant based at least in part on the portion of the transaction data associated with the merchant, wherein the first financing factor represents a first measure of income of the merchant;
  generate a first credit offer for the merchant based at least in part on the first financing factor for the merchant;
  access, based at least in part on a determination that a response to the first credit offer has not been received, a portion of interaction data associated with the merchant and stored by the payment service, wherein the portion of the interaction data indicates interactions between the merchant and one or more of an appointment service, a payroll service, or an inventory service;
  predict, based at least in part on the portion of the interaction data, additional revenue of the merchant;
  calculate, using the risk model, a second financing factor based at least in part on the predicted additional revenue of the merchant, wherein the second financing factor represents a second measure of income of the merchant;
  generate a second credit offer for the merchant based at least in part on the first financing factor and the second financing factor, wherein the second credit offer replaces the first credit offer;
  cause the merchant device associated with the merchant to display a user interface including the second credit offer;
  receive, via the user interface, an indication of an acceptance of the second credit offer; and
  cause, based at least in part on receiving the indication of the acceptance, an amount of funds associated with the second credit offer to be transferred to a financial account of the merchant, wherein at least a portion of the funds are repaid to the payment service by funds withheld from proceeds of one or more future transactions associated with at least one of the payment service, the appointment service, the payroll service, or an inventory service.

16. The one or more non-transitory computer-readable media of claim 15, wherein the portion of the interaction data includes information that comprises one or more of:
  information about one or more appointments made by the merchant;
  information about a payroll of the merchant;
  information about an inventory of the merchant;
  information about one or more marketing activities of the merchant;
  information about a customer base of the merchant; or
  information about one or more instant deposits to the financial account associated with the merchant.

17. The system of claim 8, wherein the risk model comprises one or more component models trained via machine-learning.

18. The one or more non-transitory computer-readable media of claim 15, wherein the second credit offer is generated further based on:
  a size of the merchant; or
  a business sector associated with the merchant.

19. The method of claim 1, wherein the second credit offer replaces the first credit offer by an update to the first credit offer.

20. The one or more non-transitory computer-readable media of claim 15, wherein the portion of interaction data comprises a first portion, and wherein the software is further operable when executed to:
  compare the first portion of the interaction data with a second portion of the interaction data associated with one or more other merchants determined to be similar to the merchant; and
  calculate the second financing factor based at least in part on a result of comparing the first portion of the interaction data with the second portion of the interaction data.

* * * * *